United States Patent [19]

Fletcher et al.

[11] 3,758,718

[45] Sept. 11, 1973

[54] TRANSPARENT SWITCHBOARD

[76] Inventors: James C. Fletcher, Administrator of the National Aeronautics and Space Administration with respect to an invention by; Hans P. Rasmussen, Lierbyen, Norway

[22] Filed: Feb. 15, 1972

[21] Appl. No.: 226,476

[52] U.S. Cl. .................... 178/18

[51] Int. Cl. .................... G08c 21/00

[58] Field of Search .................... 178/18, 19, 20; 317/149; 340/365, 336

[56] References Cited

UNITED STATES PATENTS

| | | | |
|---|---|---|---|
| 3,106,707 | 10/1963 | Thompson | 178/18 |
| 3,423,528 | 1/1969 | Bradshaw | 178/19 |
| 3,032,609 | 5/1962 | Fluhr et al. | 178/18 |
| 3,056,907 | 10/1962 | Costanzo | 317/149 |
| 3,461,454 | 8/1969 | Steckenrider | 178/19 |

*Primary Examiner*—Kathleen H. Claffy
*Assistant Examiner*—Kenneth Richardson
*Attorney*—Marvin J. Marnock, John R. Manning et al.

[57] ABSTRACT

A tin oxide coating is formed on a plate of glass and the coating is then etched away from the glass in thin lines to form separate electrical conductors which extend to one end of the plate and connect to either a vertical (column) or horizontal (row) position sensing SCR circuit. A thin transparent insulating coating is formed over the oxide layer except at selected touch points which are positioned in a matrix pattern of vertical columns and horizontal rows. Touching one of these points with a finger bridges the thin line between adjacent conductors to activate trigger circuits in the particular row and column sensing circuits associated with the point touched. The row and column sensing circuits are similar and are powered with a low frequency, AC voltage source. The source for the row circuits is 180° out of phase with the source for the column circuits so that one circuit acts as ground for the other during half of the supply voltage cycle. The signals from the sensing circuits are input to a logic circuit which determines the presence of a "valid" touch (indicated by outputs of predetermined duration from only a single column circuit and a single row circuit), stores a binary matrix number associated with the touched point, signals a computer of the presence of a stored number and prevents storage of a new number before receiving an enable signal from the compter.

13 Claims, 7 Drawing Figures

TRANSPARENT SWITCHBOARD

The invention described herein was made in the performance of work under a NASA contract and is subject to the provisions of Section 305 of the National Aeronautics and Space Act of 1958, Public Law 85-568 (72) Stat. 435 45 U.S.C. 2457.

BACKGROUND OF THE INVENTION

1. Field of the Invention

The present invention relates to means for responding to information provided on the output portion of a monitored machine. The response is input into the same or a different machine by touching a particular point on the output portion of the monitored machine. In the preferred form of the present invention, the field of the invention relates to man-machine communication wherein a man responds to information appearing on the CRT of an output device by touching a transparent keyboard on the face of the CRT at a point where the desired response is displayed or is indicated.

2. Description of the Prior Art

One of the most common prior art systems employed to transmit an operator's command or information to a machine is a keyboard having a series of fixed inputs positioned about the keyboard in a predetermined array. Other common input techniques and devices include punch cards, paper tapes, magnetic tape, teletype, lightpen and manual switches.

In situations requiring a fast response to information appearing at the output of a machine, response input methods which require the use of keyboards, magnetic tape, teletype or other coding operations are often too slow. In addition, such devices may require that the operator transfer his attention from the area where he is receiving information from one machine to the area where he must input information to the same or a different machine.

The conventional lightpen system eliminates certain of the time disadvantages associated with many of the prior art systems, but is undesirable to the extent that inadvertent movements of the lightpen may easily cause mistaken information to be input to the machine. One prior art system has suggested the use of a lightpen stylus which senses signals serially encoded in time from the surface of a wire screen representing a tablet. The system is undesirable, however, to the extent that the operator's hand movement and the video display are at separate locations. In addition, most lightpen systems employ a cumbersome electrical conductor extending between the lightpen and an input machine. While the lightpen systems provide high resolution, they are often complex, expensive and difficult to use and maintain.

In the specific area of devices adapted to permit a response to information provided on an output display by applying a stimulus to a portion of the display, the prior art has suggested the use of a movable mechanical linkage extending between the display and a remote electrical circuit. However, such a system requires a relatively complex stylus design and is relatively slow. It has also been suggested that magnetic induction devices could be employed to correlate a position within an electrical signal. Such devices, however, require energization of magnetic fields and movement of mechanical devices both of which tend to require complex equipment. The stylus or mechanical pick-up mechanism required in magnetic induction devices imposes undesired speed limitations.

One of the most recent techniques has been the use of metallic touch points and electrical leads inserted in a plate of transparent material such as acrylic plastic. The plate is positioned over the cathode ray tube in the output portion of a machine. When any given point is touched, a detection system provides an input to a processing system which stores the number associated with the point and subsequently releases it into a computer. Suitable provisions are made for ensuring that only desired or "valid" touches are detected and stored. One of the primary difficulties associated with this system is that it employs opaque touch points and leads which obscure vision of the images on the cathode ray tube underlying the acrylic plate. The alignment, securing and exposing of specific touchpoint electrodes in the acrylic plastic plate is difficult and expensive and the system is subject to breakage and wear. For maximum visiblity through the overlay, the leads extending from the touch points must be as small as possible which in turn makes them difficult to handle and increases their susceptibility to breakage.

In the system just described, a proximity sensing circuit is employed in which capacitive loading provided by the operator's touch provides the input stimulus to the sensing circuitry. To the extent that capacitive systems require high frequency signals, such systems are subject to undesirable cross talk which can adversely affect system operation. Such systems are also to some extent dependent upon the relative potential of the operator's body with respect to the potential of the touch point electrodes. This feature of such systems as well as their susceptibility to triggering by inadvertent, non-touching movement in the near vicinity of the electrodes increases the danger of faulty operation.

Other prior art triggering systems per se are activated by closing an electrical circuit. In triggering systems where the operator's body is employed to provide a circuit to ground, prolonged touching of the triggering electrodes may increase the electric potential on the operator's body if he is isolated from ground. Once the operator's potential approaches that of the triggering electrodes, unreliable triggering operation may follow.

SUMMARY OF THE INVENTION

The system of the present invention employs a transparent, electrically conductive coating of tin oxide which is carried over a glass plate to form an overlay which is placed over the face of a cathode ray tube or other output display device. The tin oxide coating is etched away from the face of the plate in thin lines to form a series of separate, non-touching electrical conductors which extend to one end of the plate where each conductor is connected to a vertical or horizontal position sensing circuit. A transparent, insulating lacquer coating covers the tin oxide layer except at selected touch points which are equally spaced from each other in a matrix pattern of columns and rows. The adjacent conductors exposed at a touch point provide a vertical and a horizontal coordinate which locates the position of the point in the overlay. When an operator touches a touch point, the etched away space between adjacent conductors is bridged to provide an input stimulus in the horizontal sensing circuit and the vertical sensing circuit associated with the point touched to the bias SCR's in the two circuits into conduction.

Each of the horizontal row sensing circuits is supplied from a low frequency AC voltage source which is 180° out of phase with the voltage source supplied to the vertical (column) sensing circuits. Bridging the gap at a touch point permits the SCR's to begin conducting during the positive half cycles of their respective supply voltages. The phase difference between supply voltages acts through the electrical connection provided by the touch to permit one sensing circuit to function as ground for the other during half of the supply voltage cycles.

The output signals derived from the column and row sensing circuits are employed to provide inputs to a logic circuit which detects the presence of a valid touch, stores a number identifying the point touched, signals a computer of the presence of a stored number and then prevents storage of a new touch point number until the computer has processed the stored number.

The present system permits conventional optical display devices to be adapted to use in direct man-machine communications. The low frequency signals used in the sensing circuits of the system eliminate capacitive coupled (non-touched) triggering so that only an actual touch will provide the desired input stimulus. As compared with capacitive input triggering, the system of the present invention is less susceptible to non-touched, accidental triggering. In addition, the triggering system of the present invention eliminates the danger of an ungrounded operator being charged to approximately the same potential as the electrodes at the touch point.

One of the important features of the present invention is the use of transparent conductors which extend across the face of the supporting glass plate. Such conductors and their positioning provide a transparent overlay free of opaque electrodes and leads which increases the operator's visibility of the output display in the machine being monitored. The transparent conductor of the present invention includes a tin oxide coating formed over glass. The coating is relatively inexpensive, easy to form and etch, resistant to acids and is durable.

As compared with lightpen systems, the present invention provides a more precise response and eliminates the electrical line extending between the pen and a machine. As compared with systems requiring the use of a stylus and a mechanical linkage, the present system is quicker, more reliable and easier to build and maintain.

The foregoing as well as other features and advantages of the system of the present invention will be more readily appreciated from the following specification, drawings and related claims.

DESCRIPTION OF THE PREFERRED EMBODIMENT

Figure 1:
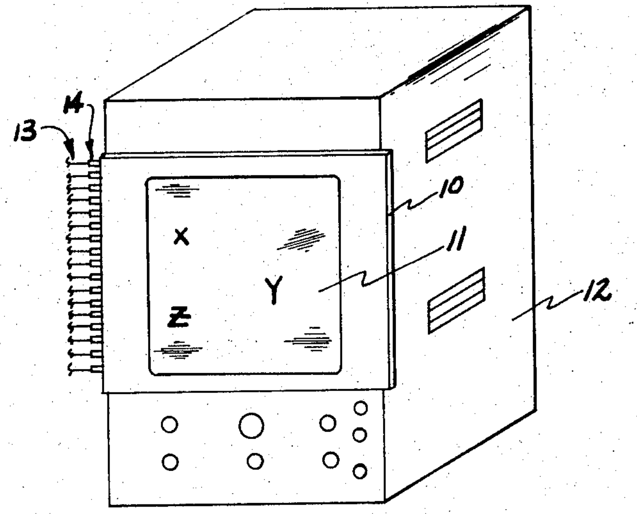
FIG. 1 is a perspective view illustrating the transparent overlay of the present invention positioned over the face of a cathode ray tube which provides an output display for an oscilloscope or similar device.

FIG. 1 of the drawings illustrates a transparent overlay or plate 10 positioned over the face of a cathode ray tube 11 which functions as the output portion of a machine 12. It will be appreciated that the machine 12 may be any device which provides a visible display of its output over a given monitored area. In the example of FIG. 1, the machine 12 is illustrated as representing an oscilloscope. Any suitable means may be employed to maintain the overlay 10 at a fixed position with respect to the cathode ray tube 11.

At one end of the plate 10, a plurality of electrical lines indicated generally at 13 are electrically connected to metal tabs indicated generally at 14 which in turn are mechanically secured to the plate 10. Each of the leads 13 and tabs 14 are electrically isolated from each other to provide separate electrical conductors.

In its preferred form, the plate 10 is transparent and provides little or no distortion of images or other information appearing on the face of the CRT 11. In use, the operator monitoring the information appearing on the CRT 11 will respond to the information by touching the overlay 10 at a position dictated by the meaning or location of the image appearing on the CRT. Touching the plate 10 provides a stimulus which establishes the input to an associated machine (not illustrated) connected to the plate 10 through the leads 13 and tabs 14.

Figure 3:
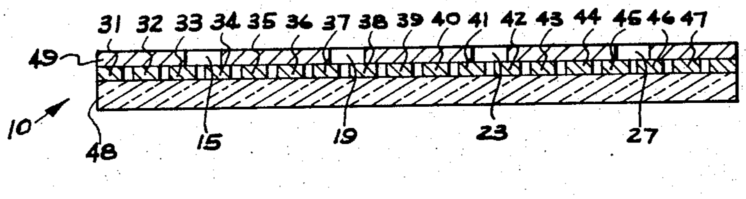
FIG. 3 is a cross-section taken along the line 3—3 of FIG. 2.
Figure 2:
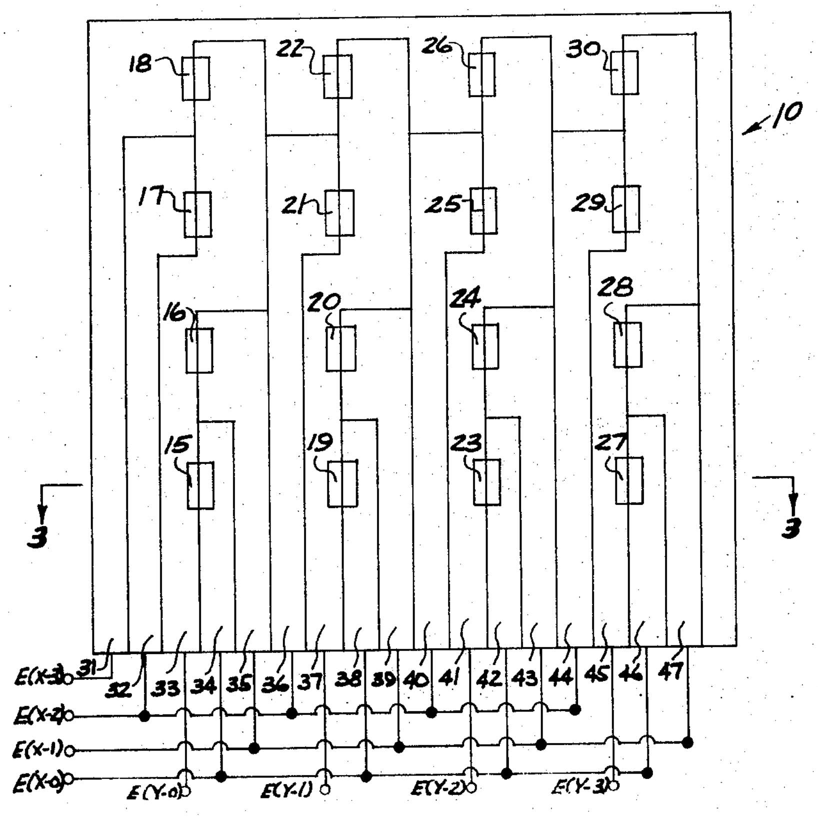
FIG. 2 is a schematic representation illustrating the spaced touch points of the present invention positioned over the face of the overlay in a matrix pattern of columns and rows.

The construction of the transparent overlay plate 10 is illustrated in FIGS. 2 and 3. For purposes of illustration, solid lines have been placed on the face of the plate illustrated in FIG. 2 to represent the positions and the construction of the touch points provided over the face of the plate. In face, however, the lines are actually invisible as will be more fully understood from the explanation which follows. In the illustration of FIG. 2, the plate 10 is represented as including 16 equally spaced touch points positioned over the face of the plate. Any desired number of touch points having any desired spacing may be employed depending upon the resolution required and the output display with which the plate is to be used. The plate 10 includes the touch points 15–30 and transparent conductive strips 31–47 extending between the touch points and the left hand edge of the plate 10 as it is oriented in FIG. 2. Each of the conductive strips 31–47 is physically separated from adjoining strips to prevent electrical contact between the strips.

Referring to FIG. 3, thee conductive strips 31–47 are formed on a supporting, transparent glass plate 48 and an insulating layer of clear lacquer 49 is formed above the conducting strips 31–47 except at small rectangular areas which form the touch points 15–30.

Referring back to FIG. 2, it may be seen that each of the touch points 15–30 is formed by two adjacent non-touching transparent conductive strips surrounded by an insulating, transparent coating of lacquer. The touch points 15–30 are arranged in a matrix array consisting of vertical columns (X-coordinate) and horizontal rows (Y-coordinate). The touch points 15–30 are configured so that the separation between adjacent conductive strips is bridged by a human finger when the finger engages the two conductive layers within the uninsulated area of the touch point. Touching thus provides electrical communication between the two adjacent conductor strips.

The column or X-coordinates for the touch points are connected by separate conductor strips which connect to the touch points and extend to the left hand edge of the plate 10 where touch points in the same column are then connected to each other by suitable jumpers. As illustrated in FIG. 2, the left hand column which provides the X-coordinates for the touch points within the column is formed by the connection provided with conductor strips 34, 38, 42 and 46. This latter group of conductor strips is connected to a common terminal E(X–0) so that an input detected on any of the points 15, 19, 23 or 27 provides an electrical output at E(X–0) indicating that a point in a first vertical column has been touched. The second column from the left consisting of touch points 16, 20, 24 and 28 connects each touch point in the column with the left hand edge of the plate 10 through conductive strips 35, 39, 43 and 47, respectively which in turn connect to terminal E(X–1). The third column from the left is connected to the left edge of the plate through conductor strips 32, 36, 40 and 44 which are connected to terminal E(X–2). The last column is connected to the left edge of the plate 10 through conductive layer 31 which also functions to electrically connect all of the touch points 18, 22, 26 and 30 in the column and is connected to terminal E(X–3).

The uppermost touch points have a common Y-coordinate and are connected by the conductive strip 33. The strip 33 electrically connects one of the two exposed touch electrodes within touch points 15, 16, 17 and 18 to a tab 13 secured to the left of the plate 10 which in turn connects to terminal E(Y–0). Conducting strip 37 functions in the same way to connect a second row of Y-coordinates which provides the vertical coordinate elctrode for touch points 19, 20, 21 and 22 to terminal E(Y–1). Conductor strip 41 connects the next lower Y-coordinates for touch points 23, 24, 25 and 26 to terminal E(Y–2) and the lowermost vertical row provided by conductor strip 45 provides the Y-coordinate for touch points 27, 28, 29 and 30 and is connected to terminal E(Y–3).

Figure 4:
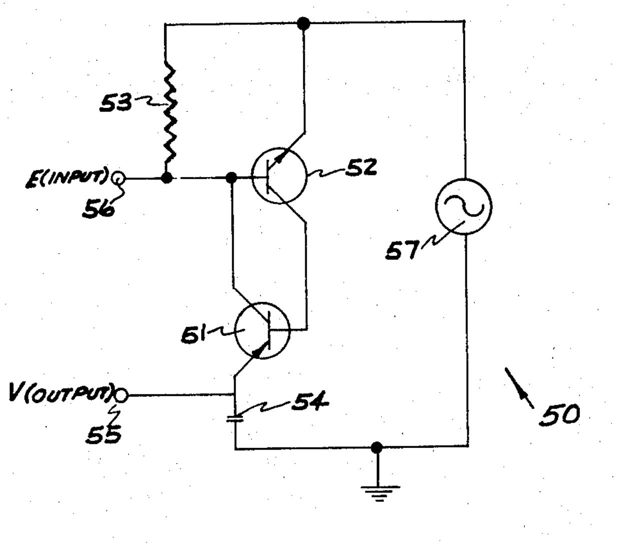
FIG. 4 is a circuit diagram of a sensing circuit employed to detect the occurrence of a stimulus at the touch point with which it is connected.

Terminals E(X–0), E(X–1), E(X–2), E(X–3), E(Y–0), E(Y–1), E(Y–2) and E(T–3) from the rows and columns are each connected to a sensing circuit similar to the circuit 50 illustrated in FIG. 4. Thus, a total of eight circuits which are similar to the circuit 50 are included in the sensing portion of the system of the present invention. The primary function of the circuit 50 illustrated in FIG. 4 is to detect the presence of a given stimulus which in the preferred case is the occurrence of a touch at a touch point and to provide an output signal which continues as long as a finger is held in contact with the touch point and which terminates when the finger is removed from the touch point.

The circuit 50 functions as a silicon controlled rectifier (SCR). The rectifier is provided by two transistors 51 and 52 connected as illustrated. A resistor 52 is connected between the base and emitter of transistor 52 and a capacitor 54 is connected between the emitter of transistor 51 and ground. The output signal is developed across the resistor 54 and appears at 55 and the input to the circuit 50 is supplied to the base of transistor 52 at an input terminal 56. It will be appreciated that each of the eight terminals E(X) and E(Y) from the plate 10 is connected to an input terminal corresponding to the terminal 56 for the sensing circuit for the respective row or column from which the input is derived. Each of the circuits 50 is powered by an alternating current voltage supply source 56. The supply source 57 employed in the column sensing circuits is 180° out of phase with the alternating current power supply employed for the row sensing circuits. When the row and column electrode are bridged by touching one of the touch points, the two circuits 50 employed to sense the presence of the touch are electrically connected and operate to provide a ground for each other during one-half of the alternating current power cycle. By this means, the need for a third electrode which would supply a ground connection is eliminated while simultaneously providing a system which does not require the operator's body to provide a circuit to ground.

Figure 5:
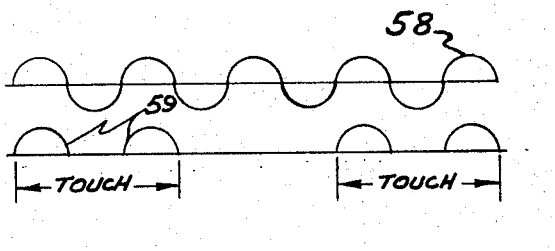
FIG. 5 is a schematic diagram illustrating signal waveforms for the power supply and output of the circuit of FIG. 4.

FIG. 5 illustrates the alternating current voltage supply wave form 58 which is output from the source 57. When the touch point electrode connected to terminal 56 is touched, the input 56 is connected to ground and during the positive portion of the signal from 57, current will flow through resistor 53, through the operator's finger, into the second touch point electrode to ground. The voltage drop across resistance 53 biases transistor 52 into conduction which in turn biases transistor 51 into conduction. During the positive portion of the power signal, the collector of transistor 51 will require greater current than can be fed by the base of transistor 52 with the additional current being supplied through resistance 53. This function provides a feedback signal which maintains the SCR in conduction during the positive half-cycles from the power supply 57. During the negative portion of the cycle from the power supply, the transistors 52 and 51 are backbiased which prevents conduction through the SCR. When the input terminal 56 is connected to ground, positive half-cycles of the power source 57 appear at the output terminal 55 as indicated in FIG. 5 at 59. When the impedance between the input terminal 56 and ground is large, corresponding to an open circuit or a non-touched condition, no signal is developed at the output terminal 55.

Figure 6:
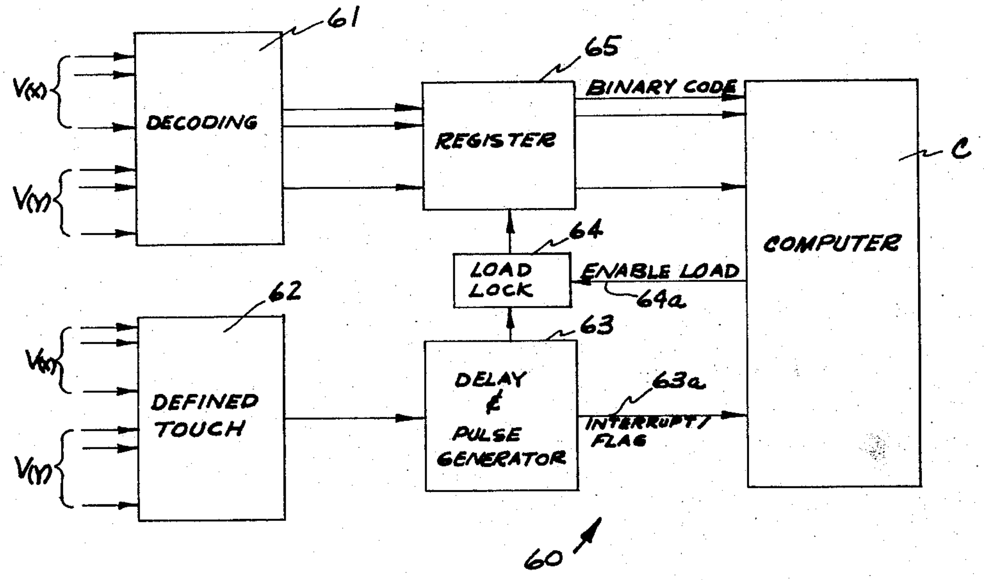
FIG. 6 is a schematic block diagram illustrating the logic functions performed by the system of the present invention.

Referring to FIG. 6, a block diagram for the system which processes the output information obtained from the various sensing circuits 50 is indicated generally at 60. In operation, the circuit 60 detects the presence of an input stimulus occurring for a predetermined time at a single touch point, a set of circumstances which is hereinafter defined as a "legal" touch. In the legal touch, one and only one horizontal or row input signal is sensed and one and only one vertical or column input signal is sensed by the respective sensing circuits. The circuit 60 also functions to store a number which identifies the point touched and signals a computer connected to the system that a legal touch has been registered. Finally, the circuitry 60 prevents a second touch from being stored or processed by the computer before the computer signals its readiness for the next number.

In FIG. 60, a binary decoding circuit 61 assigns a number to each touch point from horizontal H's and vertical V's input signals obtained from the sensing circuits 50. A defined touch circuit 62 determines whether the touch is valid by recognizing the present of an output V(X) produced by only a single column stimulus output V(Y) and produced by only a single row stimulus. The occurrence of these two conditions is signaled to a delay and pulse generator circuit 63 which ensures that in addition to being a single touch, the touch is of sufficient duration to represent a valid touch. When all three conditions are met, a pulse is generated and transmitted to a load lock circuit 64. The load lock 64 is signaled by a computer C when the computer is prepared to accept the number stored in a register 65. The number stored in the register 65 is that supplied by the binary decoding circuit 61. No new binary number can be stored in the register 65 until the computer C processes the stored number and signals the load lock through an enable load line 64*a*. If the touch is not held for the required time representing a valid touch, the Delay and Pulse generator 63 signals the computer along the interrupt flag line 63*a* to prevent the computer from processing the number stored in the register 65.

Figure 7:
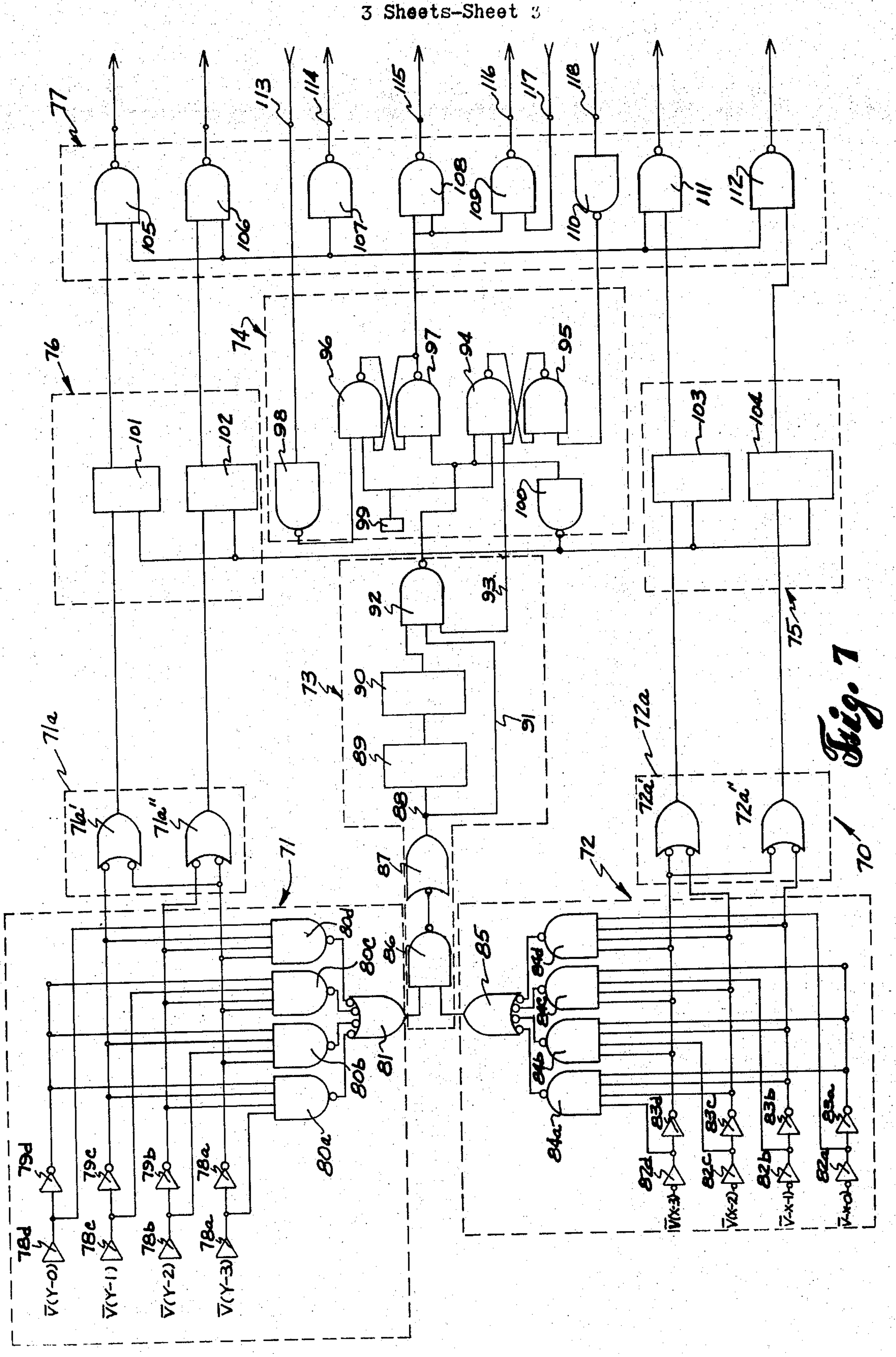
FIG. 7 is a detailed logic diagram of the digital circuitry employed to process outputs from sensing circuits such as represented by the circuits illustrated in FIG. 4.

FIG. 7 illustrates an exemplary circuit 70 which is capable of providing the desired logic function. The logic circuit 70 includes a Y-coordinate processing portion indicated generally at 71, a binary decoding circuit 71*a*, an X-coordinate processing portion indicated generally at 72, a binary decoding circuit 72*a*, a defined touch circuit indicated generally at 73, a coordinating circuit indicated generally at 74, register segments indicated generally at 75 and 76, and a computer interface circuit indicated generally at 77.

The circuit 71 includes two inverter amplifiers 78*a*–78*d* and 79*a*–79*d*, respectively, in each of the four inputs to the circuit. The outputs from amplifiers 79*a*–79*d* are input to four nand gates 80*a* through 80*d*. The outputs from gates 80*a*–80*d* form the four inputs to a nand gate 81. The X-coordinate circuit 72 is similar to the circuit 71 and includes at each input circuit a pair of inverting amplifiers 82*a*–82*d* and 83*a*–83*d*. The outputs from the amplifiers provide inputs to four nand gates 84*a*–84*d* and the outputs from the gates 84*a*–84*d* provide inputs to a nand gate 85.

The defined touch circuit 73 includes a nand gate 86 whose two inputs are provided by the outputs from nand gates 81 and 85. The output from nand gate 86 forms the input to a single input nand gate 87 whose output is formed at the output terminal 88. The signal at terminal 88 forms the input to a monostable multivibrator 89 having its output connected to a second monostable multivibrator 90. The output from terminal 88 is also conveyed by a line 91 to one input of a three input nand gate 92. The other two inputs for gate 92 include the output from monostable multivibrator 90 and the signal appearing on a line 93 from the coordinating circuits 74.

The circuit 74 includes a load lock latching circuit formed by nand gates 94 and 95 and an interrupt blocking circuit formed by nand gates 96 and 97. The outputs of gates 94 and 95 and of gates 96 and 97 supply inputs to each other to provide the latching function. A "strobe" signal from the computer (not illustrated) connected with the circuit 70 is input through a nand gate 98 and the output from the gate is employed to form one input to gate 96. The third input to gate 96 is supplied from a signal source 99 which also supplies one of the three input signals to gate 94. The output signal from the defined touch circuit 73 provides an input to latching gates 94 and 97 and also supplies the single input to a nand gate 100. The output from nand gate 100 is provided as an input to flip-flops 101, 102, 103, 104 included in the register segments 75, 76.

Within the computer interface circuit 77 are included nand gates 105, 106, 107, 108, 109, 110, 111, and 112. The gates in the computer interface circuit 77 are transistor transistor logic (TTL), open collector output gates which go to the input bus of the PDT–9 computer. The strobe connection to the computer provides inputs to gates 105, 106, 107, 111 and 112. The output from gate 97 of the interrupt latch forms both inputs to gate 108 and one of the inputs to gate 109. The second inputs of gates 111 and 112 are provided by flip-flops 103 and 104, respectively. Gates 105, 106, 111, and 112 are employed to provide the binary numbers associated with the touch point being touched. The output from gate 112 represents the least significant bit, the output from gate 112 is the next higher bit order, the output from gate 105 represents the next higher bit order, and the output from gate 106 represents the most significant bit. The inputs and outputs to and from the computer interface circuit 77 are designed for use with a TDP–9 computer (not illustrated). The "strobe" signal is input to the circuit 77 through an input terminal 113, a "read request" signal is provided at output terminal 114, a "program interrupt" signal is provided at output signal 115, a "skip request" signal is provided at output terminal 166, IOT 4021 input signals are provided at input terminal 117 and an enable load signal is provided at input terminal 118. It will be appreciated that the specific outputs and inputs into the logic circuitry 70 may be designed to conform or adapt the circuit to the particular computer to be employed.

OPERATION OF LOGIC CIRCUIT 70

The inputs $\overline{V}$ supplied to circuits 71 and 72 are all at a high (corresponding to a logic 1) before the touch points are stimulated (touched). When one or more touch points is stimulated, the column and row sensing circuits associated with the point or points touched produce a low (corresponding to a logic 0) at the inputs to one or more of the first set of amplifiers 78*a*–78*d* and 82*a*–82*d*. The output from gate 81 remains at a high until one and only one of the $\overline{V}(Y)$ inputs is a low. This situation corresponds to one and only one row touch point electrode being stimulated. Similarly, the output from gate 85 is one only when one column and only one column touch point electrode is touched. Thus, only when a single touch point is touched are the outputs from gates 81 and 85 at a high. In the way of example, if the input $\overline{V}(Y-3)$ goes low and all other inputs to the circuit 71 remain high, the output through the amplifier 78*a* is a high and the output from the amplifier 79*a* is a low. The corresponding outputs from the amplifiers in each of the other non-touched circuits are opposite from those of the touched circuit.

Under these conditions, all four of the inputs to gate 80*a* are at a high which produces a low at the output of the gate. Gates 80*b*, 80*c* and 80*d* have one or more lows at their inputs so that a high appears at their outputs. With a low appearing at one of the inputs to gate 81, a high occurs at its output. Similarly, if all of the inputs V(X) except $\overline{V}$(X–3) are high, the output from gate 84*a* would be low and the outputs from gates 84*b* through 84*d* are high. With a low input to gate 85, a high occurs at its output. Thus, with a single vertical and a single horizontal input, the outputs from circuits 71 and 72 are both at a high. If more than one input occurs simultaneously, the output from gate 81 or gate 85 or both will go low. Thus, assuming the situation previously described, if the input $\overline{V}$(Y–2) goes low, corresponding to the touch at the corresponding electrode, the output from amplifier 78*b* goes high and the output from amplifier 79*b* goes low. One of the inputs to gate 80*a* then goes low causing a high output from the gate. Under these conditions, all of the inputs to gate 81 are high which produces a low at its output.

With both inputs to gate 86 at a high, corresponding to a single touch, the gate's output goes low and is inverted by the gate 87 to provide a high at terminal 88. Thus, when the level at 88 is high, one and only one touch point has been stimulated. The occurrence of a high at 88 triggers the monostable multivibrator 89 which introduces a 50 microsecond delay. On the falling edge of the 50 microsecond pulse from the monostable multivibrator 89, the second multivibrator 90 is triggered and sends out a 60 nanosecond pulse which produces a logic high. This pulse forms one of the inputs to the gate 92 and when both of the other inputs are at a high, a low is produced at the gate's output which loads flip-flops 101, 102, 103, and 104 with the binary number associated with the touch point stimulated. Simultaneously, the interrupt latch circuit formed by gates 96 and 97 is set and the load lock latch formed by gates 94 and 95 is fed back to form the third input to gate 92 which functions to stop all other pulses coming from the multivibrator 90 until the computer has read the contents of the register 75 and 76 and reset the load lock and interrupt latches.

The input from terminal 88 is conveyed by line 91 to the gate 92 and prevents entry into the register of a number produced by a touch having a time duration which is less than the delay of the monostable multivibrators 89 and 90. If the touch is maintained long enough the computer is permitted to process the touch and the circuit 70 is reset to register the next touch. Any contact bounce from the finger leaving the touch point will trigger the monostable multivibrators 89 and 90 but will not be loaded in as a valid touch because of the absence of a high at terminal 88 at load time. Monostable multivibrator 8 or 9 is employed to ensure that all levels are stable and established when the loading occurs. By varying the time constants of the output from the monostable vibrator 89, it will be appreciated that the time duration required for valid touch may be varied as desired.

Referring briefly to FIG. 2, touch points 15 through 30 are assigned a binary number for purposes of identification to permit them to be processed by the digital circuitry of FIG. 70. Numbering starts with 0000 for touch point 15 and proceeds to the right with the number for touch point 16 being 0001. This numbering system is applied to each point and the point 30 is assigned the number 1111. Binary decoding circuits 71*a* and 72*a* connected to the outputs from the circuits 71 and 72, respectively, provide the binary decoding of the various touch points. Circuit 71*a* include two nand gates 71*a'* and 71*a''*.

The binary decoding is accomplished by the circuit 71*a* and 72*a* in the following manner. The binary number assigned to touch point 20 is 0101 and when touch point 20 touched, the sensing circuits provided with an input E(Y–1) and E(X–1). This produces an output from the sensing circuit of V(Y–1) and V(X–1). These output signals are inverted and applied to the appropriate circuit 71 or 72 to cause the respective inputs to go low. Under these conditions with the other inputs to circuits 71 and 72 high, gate 71*a'* has a high and a low input to produce a high output, gate 71*a''* has two high inputs to produce a low output, gate 72*a'* includes two high inputs to produce a low output and gate 72*a''* has a high and a low input producing a high output. In binary form, the input to the register flip flops 101–104 is 0101 where flip flop 101 registers the most significant bit, 102 registers the next most signfiicant bit, 103 registers the next most significant bit and 104 registers the least significant bit.

CONSTRUCTION OF THE TRANSPARENT OVERLAY

Where tin oxide is employed as the transparent conductive coating, the coating may be applied to the glass surface in several different ways. Any of the three following methods (as well as others) may be employed:

1. Spraying hot glass (550°–650°C) with a solution of stannic chloride containing various additives (10 percent solution by volume of $SnCl_4$ in iso-propyl alcohol).

2. Dipping glass preheated to the softening point into a liquid bath at 120°–130°C where the bath contains by volume, 2 parts of stannic chloride, 1 part glacial acetic acid, and 1 part absolute alcohol.

3. Heating $SnCl_2 2H_2O$ crystals to 400°C in an oven, melting the resulting crystals in a tube and blowing oxygen into the tube to carry white fumes over the plate to form the coated area.

The latter method is most preferred. Preferably, the thickness of the coating is less than 1 micron. Coatings of 50 millimicrons or less are substantially color free.

Once the desired conductive coating has been formed on the glass plate, a negative having the desired conductive pattern is made and the coated plate is cut to the appropriate size, washed with acetone and dried. The coated plate is then dipped in Resist type DCR 3140. After approximately 5 minutes drying time in air, the plate is prebaked in an over for 15 to 20 minutes at 160°F. The plate is then exposed for approximately 8 minutes to ultraviolet light passing through the negative. Reflections during the exposure are minimized by employing appropriate soft black backgrounds. The exposed plate is then developed for 20 to 30 seconds in a conventional developer which brings forth the pattern of the Resist mask. The use of dies should be avoided since it may tend to soften the Resist mask. Following the developing step, the piece is post-baked for 15–20 minutes at approximately 180°F.

A bath of 2 to 3 percent hydrochloric acid having approximately 4 to 5 grains of zinc dust is employed to etch away the coating along the pattern of the exposure. The etching process is continued for 3 to 6 minutes and any metallic tin not washed away in the bath is removed with a soft cloth. Acetone is then used to remove the unexposed Resist following the completion of the etching.

CONSTRUCTION OF THE SENSING CIRCUITS

The circuits 50 are constructed with components having the following ratings:

| Component | Manufacturer | Rating or Type |
|---|---|---|
| Transistor 51 | Fairchild | PNP 2N3639 |
| Transistor 52 | Fairchild | NPN 2N3646 |
| Resistor 53 | I.R.C. | 1 meg ohm |
| Capacitor 54 | Sangamo | 10 microfarads |
| Power Supply 57 | Stancor | 6 sin ($2\pi$ 60 $t$) volts |

With a circuit 50 having components values given in the foregoing table, the triggering of the SCR may be effected by a resistance of 20 meg ohms or less between the two electrodes of a touch point. The resistance on a dry finger tip between two points having the same spacing as the electrodes is in the order of 0.5 to 2 meg ohms. Assuming the base emitter threshhold to be 0.6 volts, the current flowing in the triggering electrode is approximately 0.6 microamps. Low frequency signals are used in the sensing circuits to prevent capacitive coupled touches from triggering the sensing circuits. It will be appreciated that the term "low frequencies" is relative and designates those frequencies which prevent cross talk in a system having given circuit components with given values.

The foregoing disclosure and description of the invention is illustrative and explanatory thereof, and various changes in the size, shape and materials as well as in the details of te illustrated construction may be made within the scope of the appended claims without departing from the spirit of the invention.

What is claimed is:

1. A system for determining the location in a given surface of a point receiving a predetermined stimulus comprising:
   - a plurality of spaced points having defined X and Y coordinates in a given surface along mutually perpendicular X and Y axes;
   - at least two transparent, electrically conductive means extending to the area of each of said points;
   - X coordinate sensing means connected to one of said two conductive means from each of said points for identifying the X coordinate of a point receiving a predetermined stimulus;
   - Y coordinate sensing means connected to the other of said two conductive means from each of said points for identifying the Y coordinate of a point receiving a predetermined stimulus;
   - a carrier plate of transparent, electrically non-conductive material supporting said transparent electrically conductive means;
   - said two transparent electrically conductive means extending to the area of each of said points being formed of non-touching electrically conductive coatings which are electrically separated from each other; and
   - a coating of transparent, electrically non-conductive material disposed over said conductive coatings except in the area of said points whereby only said points are susceptible to a predetermined stimulus.

2. A system as defined in claim 1 wherein:
   - a. said spaced points are distributed on said surface in a matrix pattern and are aligned in a plurality of rows and columns extending parallel to the X-axis and the Y-axis, respectively;
   - b. said matrix pattern and transparent conductive means are distributed over a surface area having defined boundaries with the area included within said boundaries being substantially transparent;
   - c. said transparent conductive means extend from the area of said points to a remote area beyond said boundaries;
   - d. all points in a given column have the same X-coordinate and are connected by said transparent electrically conductive means to an X-coordinate sensing means for that column which identifies the X-coordinate for all points in the column; and
   - e. all points in a given row have the same Y-coordinate and are connected by said transparent electrically conductive means to a Y-coordinate sensing means for that row which identifies the Y-coordinate for all points in the row.

3. A system as defined in claim 2 wherein said coating electrically conductive transparent material includes stannous oxide.

4. A system as defined in claim 2 wherein said two transparent, electrically conductive means extending to the area of each of said points are close enough to each other at each of said points to be simultaneously touched by a human finger applied to one of said points for providing said predetermined stimulus.

5. A system as defined in claim 4 wherein each of said X and said Y-coordinate sensing means include an alternating current, relatively low frequency power supply selectively connected by operation of an electrical switch to an output circuit with said electrical switch being operated by the presence or absence of said stimulus at the point or points with which it is connected by said electrically conductive means.

6. A system as defined in claim 5 wherein:
   - a. applying a predetermined stimulus to a point electrically connects said two transparent electrically conductive means extending to the area of the point to electrically connect said X and Y-coordinate sensing means to each other; and
   - b. the power supply of said X-coordinate sensing means is 180° out of phase with the power supply of said Y-coordinate sensing means, whereby one of said sensing means provides a ground for the other during one-half of each power cycle.

7. A system as defined in claim 6 wherein said X and Y-coordinate sensing means include SCR circuits having their gates connected to the stimulus applied to said points to control conduction in said output circuits.

8. A system as defined in claim 4 further including processing means connected with said X and Y-coordinate sensing means for detecting the occurrence of a single stimulus applied to only one of said points.

9. A system as defined in claim 6 further including processing means connected with said X and Y-coordinate sensing means for detecting the occurrence of a single stimulus applied to only one of said points.

10. A system as defined in claim 9 wherein said processing means further includes means for determining the presence of a touch having a predetermined time duration, storing identification information associated with the particular point touched, signaling associated equipment of the presence of stored information and preventing signaling of the presence of new information until said associated equipment provides a predetermined enabling signal.

11. A system for determining the location in a given surface of a point receiving a predetermined stimulus comprising:

a plurality of spaced points having defined X and Y coordinates in a given surface along mutually perpendicular X and Y axes;

at least two transparent, electrically conductive means extending to the area of each of said points;

X coordinate sensing means connected to one of said two conductive means from each of said points for identifying the X coordinate of a point receiving a predetermined stimulus; and Y coordinate sensing means connected to the other of said two conductive means from each of said points for identifying the Y coordinate of a point receiving a predetermined stimulus, said X and Y coordinate sensing means including an alternating current, relatively low frequency power supply selectively connected by operation of an electrical switch to an output circuit with said electrical switch being operated by the presence or absence of said stimulus at the point or points with which it is connected by said electrically conductive means.

12. A system as defined in claim 11 wherein:

a. applying a predetermined stimulus to a point electrically connects said two transparent electrically conductive means extending to the area of the point to electrically connect said X and Y-coordinate sensing means to each other; and b. the power supply of said X-coordinate sensing means is 180° out of phase with the power supply of said Y-coordinate sensing means, whereby one of said sensing means provides a ground for the other during one-half of each power cycle.

13. A system as defined in claim 12 wherein said X and Y-coordinate sensing means include SCR circuits having their gates connected to the stimulus applied to said points to control conduction in said output circuits.

* * * * *